3,397,146
LUBRICATING COMPOSITIONS
Robert A. Cupper, Ridgefield, Conn., and Maurice W. Ranney, New City, N.Y., assignors to Union Carbide Corporation, a corporation of New York
No Drawing. Filed Aug. 22, 1966, Ser. No. 573,818
2 Claims. (Cl. 252—34)

ABSTRACT OF THE DISCLOSURE

Lubricating compositions comprising mineral oil containing as a viscosity index improver-dispersant additive a polymer of a long chain alkyl acrylate or methacrylate, alkyl acrylate or methacrylate wherein the alkyl has from 1 to 4 carbon atoms, and acrylic or methacrylic acid, wherein the acid moieties of the polymer are neutralized with a 1-hydroxy-alkyl-2-alkyl or alkenyl imidazoline.

---

The invention relates to improved lubricating compositions which contain a copolymer of long chain alkyl acrylate or methacrylate, short chain alkyl acrylate or methacrylate, and acrylic or methacrylic acid, wherein the acid moieties of the copolymer have been neutralized with an imidazoline composition. The lubricating compositions of the invention have excellent viscosity index and dispersant properties and are eminently suitable for use as multi-viscosity, high detergent lubricating oils in automobile crankcases.

With automobile and other internal combustion engines, it is desirable to provide lubricants that will permit efficient operation over long periods of time. All crankcase lubricants are gradually fouled by impurities from several sources, the most significant of which are partially oxidized combustion products from the engine fuel. These combustion products are usually rather insoluble in oil, and they therefore tend to separate from the oil and form sludge and gummy or resinous coatings on the engine surfaces. This problem is aggravated by water which is always present to some degree in the crankcase, but which is present in fairly large amounts before the engine has heated up and during stop and go operation.

In order to combat the formation of sludge and gummy or resinous coatings on engine parts, lubricants often contain a dispersant to maintain the impurities in suspension and prevent sludge and coating formation.

The present invention provides lubricating compositions that contain a polymeric additive that imparts superior dispersancy to the lubricant. The polymeric additive also improves the viscosity index of the lubricant and lowers its pour point. The polymeric additive provided by the invention is a copolymer of:

(a) a long chain acrylate or methacrylate, at least a portion of which is alkyl acrylate or methacrylate wherein the alkyl has at least 16 carbon atoms,
(b) a $C_1$ to $C_4$ alkyl acrylate or methacrylate, and
(c) acrylic or methacrylic acid, wherein substantially all of the acid moieties in the copolymer have been neutralized with an imidazoline.

The first monomeric component of the copolymer is a long chain alkyl acrylate or methacrylate which is employed in the copolymer for oil solubility. Illustrative of such monomers are octyl acrylate, decyl acrylate, decyl methacrylate, dodecyl acrylate, tetradecyl methacrylate, hexadecyl acrylate, hexadecyl methacrylate, octadecyl acrylate, octadecyl methacrylate, eicosyl acrylate, and the like. It is essential that a portion of the long chain alkyl acrylate or methacrylate contain alkyl groups having at least 16 carbon atoms. This is essential in order that the initial oil solubility of the dispersant polymer not be changed to oil insolubility by association of the polymer with the relatively insoluble partially oxidized products of combustion referred to above. Thus, it is desirable that at least about 15 weight percent, preferably at least 20 weight percent, and more preferably at least 30 weight percent, of the long chain alkyl acrylate or methacrylate contain alkyl groups having at least 16 carbon atoms and preferably 18 carbons atoms.

The second monomeric component of the copolymer is a short chain (i.e., $C_1$ to $C_4$) alkyl acrylate or methacrylate such as methyl methacrylate, methyl acrylate, ethyl acrylate, ethyl methacrylate, propyl acrylate, isopropyl methacrylate, butyl methacrylate, and the like. The methacrylates are generally preferred, and methyl methacrylate is more preferred.

The third monomeric component is either acrylic or methacylic acid.

The proportions of the components can be varied over a moderately wide range. The long chain alkyl acrylate or methacrylate is employed in oil-solubilizing amounts, which vary slightly depending upon the exact nature of the several monomeric components, but which is usually from about 75 to 96 weight percent, based upon weight of monomeric components. As pointed out above, at least about 15 weight percent of the long chain alkyl acrylates or methacrylates are $C_{16}$ or higher alkyl acrylates or methacrylates.

The short chain alkyl acrylate or methacrylate is employed in an amount sufficient to impart viscosity index improving characteristics to the copolymer. This amount again will vary somewhat, depending upon the nature of the short chain alkyl acrylate or methacrylate, but will usually be from about 3 to about 15 weight percent, based upon weight of monomeric components.

The acrylic or methacrylic acid is employed in an amount such that the copolymer will have dispersant properties when the acid is neutralized with an imidazoline. Normally, the acid is employed in proportions of from about 0.5 to about 10 weight percent, based on weight of the monomeric components, and preferably from about 1.5 to about 3 weight percent.

The copolymer is prepared by conventional techniques. For instance, the comonomers can be mixed in the desired proportions along with a polymerization initiator, and the polymerization reaction is then usually started by heating. Normally a solvent is used for the polymerization. Illustrative solvents include pentane, hexane, heptane, octane, xylene, toluene, benzene, naphtha, or an oil. When a volatile solvent is employed, it can be distilled at the conclusion of the polymerization after oil has been added to the solution. This procedure results in a concentrated solution of the copolymer in oil.

The conventional polymerization initiators can be employed such as peroxides and azo compounds. Specific illustrative examples include t-butyl peroxypivalate, benzoyl peroxide, methyl ethyl ketone peroxide, t-butyl hydroperoxide, t-butyl perbenzoate, cumene hydroperoxide, azodiisobutyronitrile, dimethylazodiisobutyrate, and the like. Combinations of peroxides and quaternary ammonium salts can be employed as polymerization initiators. Examples of such salts include diisobutylphenoxyethoxyethyldimethylbenzyl ammonium chloride, lauryldimethylbenzyl ammonium chloride, and the like.

The polymerization initiator is employed in conventional amounts, such as from about 0.1 to about 1 weight percent, based upon weight of monomers. The polymerization temperatures are typically between 50° and 150° C., and polymerization times are normally from about 1 to about 24 hours.

The molecular weight of the copolymer is normally expressed in terms of reduced viscosity ($I_r$). Reduced viscosity is defined as:

$$I_r = \frac{T-T_0}{T_0(c)}$$

wherein T is the time required for a low concentrate copolymer solution (of concentration c in grams per 100 milliliters of solvent) to pass through a standard Ubbelohde viscometer, and $T_0$ is the time for the pure solvent to pass through the viscometer. Copolymers useful in the invention have reduced viscosities of from about 0.2 to 2, and preferably from about 0.7 to 1.3, determined at a concentration of 0.1 gram of copolymer per 100 milliliters of benzene at 20° C.

After the copolymer has been produced, the carboxylic acid moieties are fully neutralized with an imidazoline composition of the formula:

I 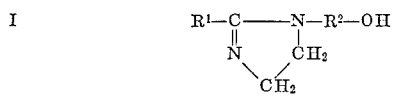

where $R^1$ is alkyl or alkenyl of up to 19 carbon atoms, and wherein $R^2$ is alkylene of from 2 to 4 carbon atoms.

The imidazoline composition is produced by reacting a monocarboxylic acid with a mono(hydroxyalkyl)ethylenediamine. The mono(hydroxyalkyl)ethylene-diamine is produced by reacting equimolar proportions of ethylene oxide, propylene oxide or butylene oxide with ethylenediamine. Ethylene oxide is preferred. The monocarboxylic acids employed to produce the imidazoline include acetic acid, propionic acid, butyric acid, pentanoic acid, hexanoic acid, heptanoic acid, octanoic acid, nonanoic acid, decanoic acid, lauric acid, myristic acid, palmitic acid, margaric acid, stearic acid, arachidic acid, oleic acid, linoleic acid, palmitoleic acid, ricinoleic acid, petroselinic acid, vaccenic acid, and the like. The acids employed have up to 20 carbon atoms and are either saturated or they can contain one or more ethylenic double bonds, and preferably not more than one double bond. Stearic and oleic acids are more preferred.

The imidazolines are produced by known procedures. For instance, the acid is heated with the hydroxyalkyl-ethylenediamine to first form a linear amide, which is then dehydrated to form the imidazoline. The following reactions are illustrative:

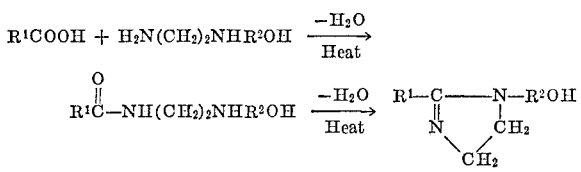

The imidazoline employed in the invention normally contains a proportion of the linear amide (for instance, from 10 to 30 weight percent) with no adverse affect. In fact, it is likely that the imidazoline moieties contained in the lubricating compositions of the invention hydrolyze during use to the linear amide to at least a limited extent. This has no adverse affect, and such amide-containing compositions are within the scope of the invention.

In addition to the imidazoline described above (which is derived from ethylenediamine), diimidazolines can also be used in the invention. For example, a diimidazoline can be produced by reacting (under conditions analogous to those described above) two moles of monocarboxylic acid with a polyalkylene polyamine having at least four amino groups. Such imidazolines have the formula:

II 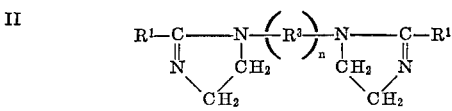

wherein each $R^1$ individually is as described above, wherein $n$ is zero or one, and wherein $R^3$ represents ethylene, ethyleneaminoethylene, or the like.

In addition, diimidazolines useful in the invention can be prepared by connecting two imidazoline compounds (as represented by Formula I) through the hydroxyl group. Thus, by reacting the imidazoline composition of Formula I with a diepoxide, a dicarboxylic acid, a diisocyanate, or the like, useful diimidazolines are prepared.

The imidazoline composition is employed to neutralize the carboxylic acid moieties of the copolymer described above. The imidazoline composition is employed in substantially equivalent amounts, that is, from about 0.8 to about 1.2 equivalents of imidazoline composition per equivalent of carboxylic acid group in the copolymer. When the copolymer is produced in a solvent such as heptane, normally a concentrate in oil is produced by adding oil to the solution of copolymer in solvent, and then removing the solvent by distillation. An excellent time to add the imidazoline composition is after the solvent has been removed. While the imidazoline composition can be added before the solvent is removed, it has been observed that a foaming problem can be encountered during the solvent removal step if the imidazoline composition is added before substantially all of the solvent is removed. The neutralization of the carboxylic acid moieties in the copolymer is effected simply by adding the imidazoline composition. Apparently a salt is thus formed, and no further reaction step is required.

The neutralized copolymers of the invention are employed as additives in oils in an amount sufficient to enhance the viscosity index and dispersant characteristics of the oil. Normally, amounts of from about 0.5 to about 2 weight percent of neutralized copolymer (percentages based on weight of oil) are employed for this purpose. The oils employed are the hydrocarbon oils of lubricating viscosity, whether of natural origin or synthetic. Preferred oils are substantially paraffinic and/or naphthenic, although some aromatic hydrocarbons can be present in the oil. the nature and production of such oils are well known in the art.

It is within the scope of the invention to employ other types of additives in the lubricating compositions. Antioxidants and extreme pressure agents are examples of known types of additives.

The following examples illustrate the invention (parts are by weight except as otherwise indicated):

Example 1

A reaction vessel is equipped with a reflux condenser, nitrogen inlet tube, stirrer, thermometer and heating mantle. The initial charge consists of 60 parts isodecyl acrylate, 3.6 parts acrylic acid, and 20 parts stearyl methacrylate, and 140 parts heptane. Then, 0.4 part t-butyl peroxypivalate is added and the heat is applied. Reaction mass temperature is maintained between 50–55° C. for 23 hours. To the viscous polymer-heptane solution, 230 parts of a 200 neutral mid-continent oil is added with stirring and the temperature maintained at 60° C. After mixing for one hour, 16.4 parts 1-hydroxyethyl-2-heptadecenyl imidazoline is added and the temperature raised to 80° C. for one hour of mixing. The reaction mass is transferred to a rotary flash evaporation unit and the heptane removed under vacuum. The final product contains 30 percent polymer in the 200 N stock. Five percent of this concentrate in a 170 N solvent refined mid-continent stock gives 57 SUS at 210° F., VI of 137 and a −35° F. pour point. Dispersancy performance is noted in Tables I and II.

Example 2

Using the same technique as above, a polymer is prepared from 1.8 parts acrylic acid, 25 parts stearyl acrylate, 5.0 parts methyl methacrylate, and 60 parts isodecyl acrylate. After polymerization is complete, 230 parts of the 200 N oil is added, 8.2 parts 1-hydroxyethyl-2-heptadecyl imidazoline is introduced, and the reaction mass stirred for one hour at 80°. After removal of the heptane under vacuum, the polymer concentration is 30%. Five percent of this concentrate in the 170 neutral stock gives a 59 SUS at 210° F., 139 VI and −35° F. pour point. Dispersance performance is shown in Tables I and II.

The Sequence 5A test, using a single CLR cylinder engine, is recognized in the industry as a screening tool for measuring the effectiveness of dispersancy of crankcase oils. The test oils consisted of 200 solvent refined neutral mineral oil containing 1.0 percent of a zinc dialkyl dithiophosphate antiwear additive and 3.95 percent of the polymer concentrates of Examples 1 and 2. Lubricants were also prepared in a similar manner using the most prominent commercial products based on vinyl pyrrolidone as the active monomeric constituent.

The engine sludge ratings obtained for these lubricants are given in Table I. The number represents the combined merit ratings for the rocker arm assembly, rocker arm cover, valve deck, timing gear cover, push rod cover, push rod chamber, and the oil pan. A clean engine would have a 70 rating according to the CRC Merit Rating System.

TABLE I.—SEQUENCE 5A DATA

[Total Sludge Rating [1]]

| Polymer | Hours on Test | | | | | |
|---|---|---|---|---|---|---|
| | 80 | 96 | 128 | 160 | 176 | 208 |
| Example 1 | 68.0+ | 68.0+ | 68.0+ | 59.1 | 53.4 | |
| Example 2 | 68.0+ | 68.0+ | 68.0+ | 68.0+ | 62.5 | 48.3 |
| Commercial Product I | 68.0+ | 54.7 | ([2]) | | | |
| Commercial Product II | 63.6 | 44.8 | ([2]) | | | |

[1] 70=Clean.
[2] Terminated.

An engine test procedure, designed specifically to measure the effectiveness of dispersant VI improvers under stop-and-go driving conditions is the Low Temperature Sludging Test using the CLR engine. Considerable proportions of water accumulate in the crankcase during short, low speed travel which tends to prematurely precipitate the polymer blowby products. The Low Temperature Sludging Test is generally recognized in the industry as a useful evaluation tool for these dispersant additives.

Data for lubricants prepared from 3.95 percent of these additives in a 200 solvent refined neutral oil with 1.0 percent of a zinc dialkyl dithiophosphate antiwear additive are given in Table II.

TABLE II.—LOW TEMPERATURE SLUDGING TEST, CLR ENGINE

[Total Sludge Rating [1]]

| Polymeric Additive | Hours On Test | | |
|---|---|---|---|
| | 86 | 110 | 134 |
| Example 1 | 41.2 | 37.8 | |
| Example 2 | 42.0 | 39.9 | 36.1 |
| Commercial Product I | 41.5 | 36.5 | 30.8 |
| Commercial Product II | 42.0 | 40.0 | 31.0 |
| Base Oil and Zn Additive | 25–30 | | |

[1] 50=Clean.

The foregoing examples illustrate how the utility of lubricating oils for use in automobile engine crankcase is enhanced by using the copolymers of the invention as additives in the oil.

What is claimed is:
1. A lubricating composition comprising a major portion of an oil of lubricating viscosity and a minor portion sufficient to enhance the viscosity index and the dispersant characteristics of said composition of a copolymer of:
   (a) an oil-solubilizing proportion of long chain alkyl acrylate or methacrylate, at least 15 weight percent of which is alkyl acrylate or methacrylate wherein the alkyl has at least 16 carbon atoms,
   (b) alkyl acrylate or methacrylate wherein the alkyl has from 1 to 4 carbon atoms,
   (c) acrylic or methacrylic acid,
wherein the acrylic or methacrylic acid moieties of said copolymer are completely neutralized with an imidazoline composition of the formula:

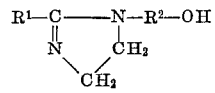

wherein $R^1$ represents alkyl or alkenyl of up to 19 carbon atoms and wherein $R^2$ represents alkylene of from 2 to 4 carbon atoms; wherein said copolymer has a molecular weight such that its reduced viscosity, tested at 20° C. at a concentration of 0.1 gram of copolymer per 100 milliliters of benzene, is in the range of from about 0.2 to 2, wherein the proportion of the monomer defined in (b) is such that said copolymer exhibits viscosity index improving characteristics, and wherein the proportion of the monomer defined in (c) is such that the copolymer when neutralized with said imidazoline composition will have dispersant properties.

2. The lubricating composition of claim 1 wherein the copolymer is a polymer of:
   (a) stearyl acrylate,
   (b) isodecyl acrylate,
   (c) methyl methacrylate, and
   (d) acrylic acid,
and wherein the imidazoline composition comprises 1-hydroxyethyl-2-heptadecenyl imidazoline.

References Cited

UNITED STATES PATENTS

| | | | |
|---|---|---|---|
| 2,737,496 | 3/1956 | Catlin | 252—51.5 |
| 2,892,821 | 6/1959 | Stewart et al. | 252—51.5 XR |
| 3,030,303 | 4/1962 | Ryan | 252—51.5 XR |
| 3,046,260 | 7/1962 | Stewart et al. | 252—51.5 XR |
| 3,108,967 | 10/1963 | Bailey | 252—51.5 |
| 3,163,605 | 12/1964 | Koch et al. | 252—51.5 |
| 3,172,856 | 3/1965 | Ovist et al. | 252—51.5 |
| 3,194,763 | 7/1965 | Gordon et al. | 252—51.5 |
| 3,210,282 | 10/1965 | Bearden | 252—51.5 |
| 3,226,372 | 12/1965 | Fareri et al. | 252—34 XR |

DANIEL E. WYMAN, *Primary Examiner.*

PATRICK P. GARVIN, *Examiner.*